Figure 1:
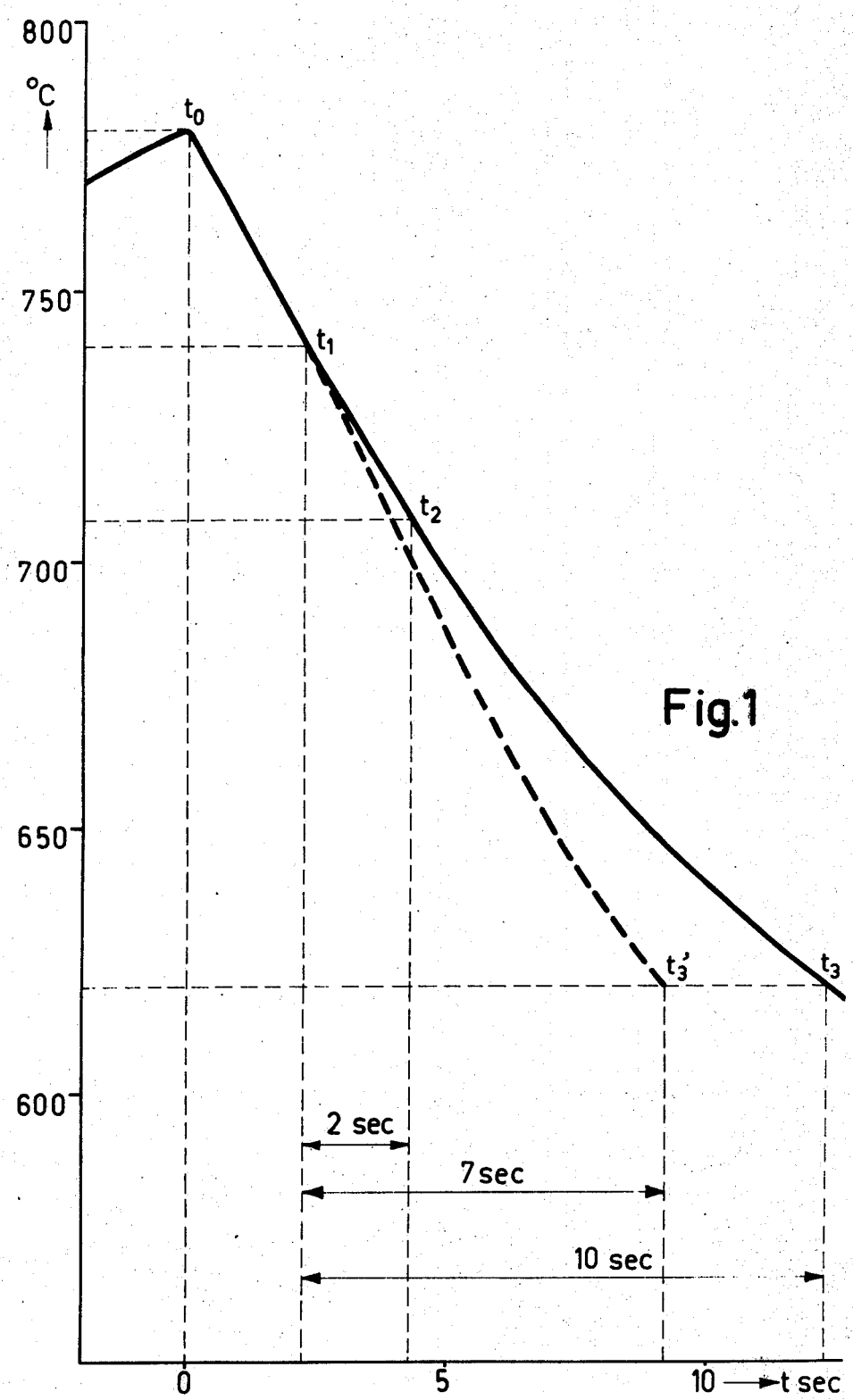

United States Patent [19]
Hurx et al.

[11] 3,993,465
[45] Nov. 23, 1976

[54] METHOD OF MANUFACTURING A TUBULAR LAMP ENVELOPE

[75] Inventors: Adrianus Antonius Hurx; Jan Man in 'T Veld; Peter Ivan Sygall, all of Eindhoven, Netherlands

[73] Assignee: U.S. Philips Corporation, New York, N.Y.

[22] Filed: Apr. 28, 1975

[21] Appl. No.: 572,528

Related U.S. Application Data

[63] Continuation of Ser. No. 507,732, Sept. 20, 1974, abandoned, which is a continuation of Ser. No. 369,551, June 13, 1973, abandoned.

[30] Foreign Application Priority Data
June 27, 1972 Netherlands.................... 7208818

[52] U.S. Cl................................. 65/110; 65/281
[51] Int. Cl.².......................................... C03B 23/08
[58] Field of Search................... 65/108, 110, 281

[56] References Cited
UNITED STATES PATENTS
2,476,658  7/1949  Geiner............................. 65/281
3,215,518  11/1965  Reijnders....................... 65/108 X

*Primary Examiner*—Arthur D. Kellogg
*Attorney, Agent, or Firm*—Frank R. Trifari

[57] ABSTRACT

The invention relates to a method of manufacturing a tubular lamp envelope for a fluorescent lamp in which a glass tube is softened by heating, bent around abending jig by means of bending members and then cooled until the material of the tube has solidified. During the solidification the tube assumes a horizontal position and the cooperation of the bending members with the tube is interrupted.

7 Claims, 13 Drawing Figures

METHOD OF MANUFACTURING A TUBULAR LAMP ENVELOPE

This is a continuation of application Ser. No. 507,732, filed Sept. 20, 1974, which was a continuation of application Ser. No. 369,551, filed June 13, 1973, both now abandoned.

The invention relates to a method of manufacturing a tubular lamp envelope which is particularly suitable for a fluorescent lamp, of which lamp envelope the tube shows a shape which is curved in a flat plane over at least a part of its length, in which an initially straight tube is softened by heating and then curved around a bending jig by cooperation with one or more bending members and then inflated so that it obtains a substantially entirely circular cross-section, and is then cooled to a temperature at which deformation of the shape of the tube as a result of gravity does no longer occur. Such a method is known.

In the conventional method of manufacturing tubular fluorescent lamps in which the tube shows a circular shape, the starting material is a straight glass tube which is covered on its inside with a fluorescent powder and which is suspended with one of its end from a holder. This tube is heated in a furnace to such a temperature that the material of the tube is softened. The free end of the tube is then clamped in a bending member in the form of tongs which occurs on the outer circumference of a circular bending jig. Such bending jig is then rolled upwards vertically along the tube so that the softened tube is wound on the bending jig. The tube must cool in the rolled condition so that the material of the tube solidifies again. Only then may the tube be removed from the bending jig and be subjected to the subsequent treatments such as evacuation and rinsing.

This known method exhibits the following drawback:

The soft tube must be held in the rolled condition until it has become sufficiently rigid by cooling to be able to be further transported without the danger of deformation. So during said solidification the holder and the tongs must keep the tube clamped on the bending jig so that these are not available to take part in bending a subsequent tube. This means that in a mechanized manufacture of this type of fluorescent lamps, the production rate is restricted by the solidification time of the glass and thus is low. Although the solidification time can be slightly reduced by subjecting the rolled tube to forced air cooling, the drawback of this is that stresses are produced in the material of the tube which have to be removed afterwards by an extra thermal treatment.

Problems present themselves not only in the manufacture of circular lamps, but also in the manufacture of lamps which are bent over only a part of their length, for example lamps in the form of a U or W. These U and W-shaped lamps are as a matter of fact softened locally and bent in a vertical plane by means of a bending device. The bent part is allowed to cool in the bending device until the material solidifies again. Only then may the tube be removed from the bending device in behalf of further treatments. So the bending device is occupied during the whole solidification period of the tube, so that the production rate of this type of lamps is also low.

It is the object of the invention to provide a method which enables a significantly higher production rate.

For that purpose, the method according to the invention is characterized in that the curved tube, at least after inflation, assumes a horizontal position during at least the greater part of the period which is necessary for cooling to the said temperature, the cooperation of the bending members with the tube being interrupted as soon as the inflation operation has been carried out and the tube assumes the horizontal position. The bending members may be either bending rollers which press the soft tube against the bending jig, or tongs which draw the tube as it were around the bending jig. The invention is based on the recognition of the fact that the production rate is increased when measures are taken which make superfluous the presence of the bending rollers or the bending tongs in the proximity of the tube which has already been bent and inflated but is still soft. According to the invention said measures consist in that the curved tube is brought or maintained in a horizontal position immediately after the bending operation and after the inflation. The tube is allowed to solidify in said horizontal position. It has been found that the cooperation of the bending members with the tube may be interrupted without the curved shape of the tube varying. Of course it should be ensured that during the removal of the bending members, the tube is already so solid that the cross-section of the tube remains substantially circular. When, however, a suitable bending temperature is chosen, it is found that the cross-section of the tube remains substantially entirely circular when the bending members are removed immediately after bending.

As appears from the German patent specification 871,927 it has already been proposed to bend glass tubes or rods to a helical or spiral-like shape to allow the bent tube or rod to cool on the bending jig. The bending members in the form of rollers no longer cooperate with the tube as soon as the latter is wound on the bending jig. Because, however, said tube shows a shape which is rather difficult to handle, said tube is to solidify on the bending jig before it can be removed from the bending device. Therefore, a high production rate will not be achieved in manufacturing the said type of tubes or rods either.

A favourable embodiment of the method according to the invention is characterized in that the tube is supported in the horizontal position by a supporting member in which the ends of the tube are each clamped in a holder member which is secured to the supporting member and in which the cooperation of the bending members with the tube is interrupted. The assembly of the supporting member and the holder member is preferably constructed as a transport unit on which the tube is held during the treatments which succeed the bending. Said further treatments are, for example, evacuation and rinsing. It is very advantageous when the ends of the tube are clamped in holder members secured to the supporting member, because the ability of the tube to be handled is considerably increased in positioning the tube relative to the evacuation or rinsing device.

According to a favourable embodiment of the method according to the invention the supporting member is formed by the bending jig. The holder members in that case are formed as clamps secured to the jig.

A further favourable embodiment of the method according to the invention is characterized in that the bending jig can be divided in the plane of the tube and that the supporting member is formed by one half of the bending jig, the cooperation of the other half of the jig with the tube being interrupted as soon as the tube bears on the half of the bending jig constructed as a supporting member. This embodiment is particularly advantageous in the series production of the said lamp envelopes because of the said other half which serves only during bending, only one specimen is necessary. Of course, several specimens are necessary of the half of the bending jig formed as a supporting member because during cooling or evacuation and rinsing of one tube the following tube is already being bent.

According to another embodiment of the method according to the invention, the bending jig can be divided in the plane of the tube, the cooperation of the bending jig with the tube being interrupted by dividing the bending jig as soon as the tube is supported by the supporting member which is constructed as a plate, said plate comprising an aperture for passing one of the halves of the bending. Supporting the tube by means of a horizontal plate provides the advantage that the tube contacts a supporting surface with only a small part of its surface so that the tube will cool very uniformly which prevents stresses from occurring in the glass. Moreover, the tube is better accessible for auxiliary tools during further treatment than when the bending jig forms the supporting member. By using a divisible bending jig the additional advantage is obtained that the tubes can be bent one after the other in a manufacturing machine while using only one bending jig.

Furthermore, in the known method not only the production rate is low, but the quality of the lamps is unsatisfactory. As a matter of fact, the tube in the known method sags slightly by its own weight when it is heated while suspended from the holder. Moreover it has been found in practice that during the vertical rolling the part of the tube which is nearest to the holder is elongated much more strongly than the lower part of the tube which has first bent, a phenomenon for which otherwise no conclusive explanation is available. All this results in the fact that the upper part of the tube which is thus situated nearest to the holder elongates more than the lower part. As a result of this the wall thickness in the upper part of the tube is smaller than in the lower part. If the tube is bent in the form of a circle, this results in a lamp which does not show the same mechanical rigidity throughout the length of the tube. A second drawback is that the thickness of the layer of fluorescent powder is not constant. As a matter of fact, said layer has already been provided on the inner wall of the tube prior to processing thereof and, as a result of the non-uniform elongation of the tube, it will show differences in thickness as a result of sagging and bending. In the operating lamp this will be noticeable as colour differences of the radiated light, particularly because, in the case of a circular lamp, the part of the tube which is least elongated adjoins the part of the tube which is most elongated.

Therefore, it is a further object of the invention to provide a method which does not exhibit the said drawback. For that purpose, the method of manufacturing in particular a circular lamp envelope is characterized in that the tube is bent in a horizontal plane, the movements which the ends of the tube make during the bending operation relative to the bending jig being replicas of each other. Since the tube is bent in the horizontal plane and not in the vertical pland as in the known method, the quality of the lamp is not adversely influenced either by the non-uniform elongation of the tube. By furthermore ensuring that the movements which the ends of the tube make during bending relative to the bending jig are replicas of each other, it is achieved that the part adjoining the ends of the tube are deformed to the same extent. As a result of this differences in mechanical rigidity and colour of the light of the lamp are avoided.

The invention furthermore relates to a lamp envelope manufactured according to any of the abovedescribed methods.

The invention furthermore relates to a fluorescent lamp comprising a lamp envelope as described above.

The invention will be described in greater detail with reference to a drawing. In the drawing:

FIG. 1 shows the temperature variation of the tube before, during and after the bending operation.

FIGS. 2a to 2g and 3a to 3e each show an embodiment of the method according to the invention.

Before the bending operation, the glass tube to be treated is heated in a furnace until it has reached a sufficiently high temperature. In the example of FIG. 1 said temperature is approximately 780° C. At the instant $t_0$ the tube is removed from the furnace after which it is cooled according to the solid line. Beginning at the instant $t_1$, at a temperature of approximately 740° C, the tube is bent. The time between $t_0$ and $t_1$, namely approximately 2 seconds, is necessary to bring the tube and the bending tool in the correct position relative to each other. Dependent upon the bending method used, the bending operation itself lasts ½ to 2 seconds.

In the known method in which the tube is in a vertical plane during the whole bending operation and the subsequent cooling period, the cooperation of the bending members and the bending jig with the tube must be maintained until the tube has cooled to a temperature of approximately 620° C. As a matter of fact, the conventionally used glass material is already so rigid at a temperature of 620° C that the tube can be removed from the bending device without the danger of deformation as a result of its own weight. The time between $t_1$ and $t_3$ which is necessary for cooling to 620° C is approximately 10 seconds. The overall cycle time, $t_0$–$t_3$, which is necessary for the bending device to bend the tube thus is approximately 12 seconds.

As already stated above, the cycle time can be slightly reduced by subjecting the tube to forced cooling. The occurring temperature variation of the tube is denoted in FIG. 1 by a broken line. It may be seen that the temperature of 620° C in that case is already achieved after approximately 7 seconds with which the overall cycle time comes down to approximately 9 seconds. However, the drawback of said forced cooling is that stresses are produced in the tube material which have to be removed in a later stage by a thermal treatment.

In the method according to the invention the tube is brought in a horizontal position after the bending operation, or, when the tube was already bent in the horizontal plane, maintained in the horizontal position, after which, as soon as the tube has been inflated to obtain a circular cross-section, the cooperation of the bending members with the tube is interrupted. It has proved possible in practice to interrupt said cooperation two seconds after the beginning of the bending operation at the instant $t_2$. It has also been found that the deformation of the cross-section of the tube then occurring remains amply within the admissible limits.

The overall cycle time $t_0$–$t_2$ necessary in the method according to the invention for bending a tube now is at most approximately 4 seconds, which means a time saving relative to the known method of at least 8 or 5 seconds. For completeness sake it has to be noted that the above-mentioned times and temperatures are given only by way of example.

Figure 2A:
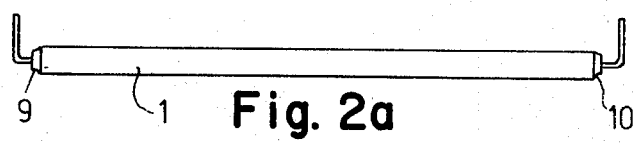
Figure 2B:
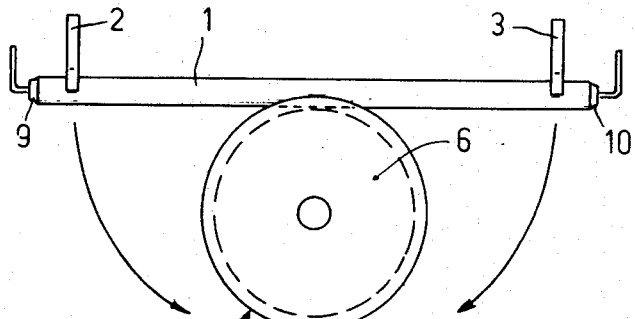
Figure 2C:
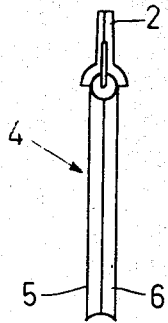
Figure 2D:
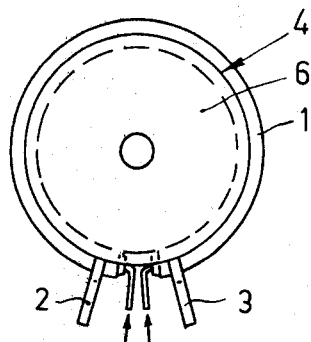
Figure 2E:
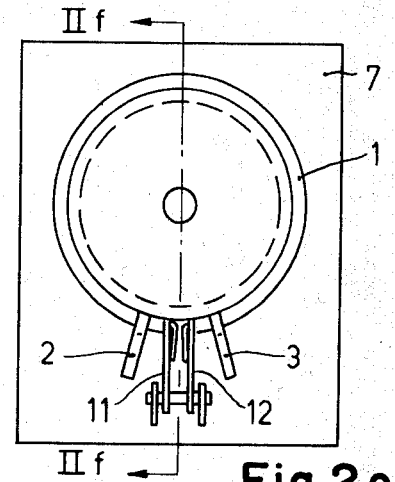
Figure 2F:
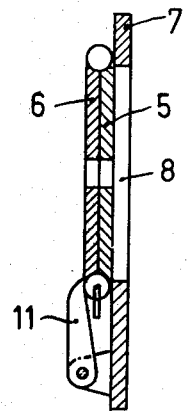
Figure 2G:
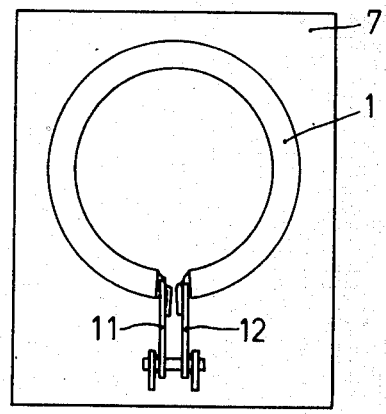

Starting material in the embodiment of the method as shown in FIG. 2a–2g is a straight glass tube 1 (FIG. 2a) which is bent in the horizontal plane to form a circle. The bending operation is carried out by means of two bending members 2 and 3 in the form of tongs which draw the tube about the bending jig 4 (FIG. 2b). The movements which the tongs make are replicas of each other. The bending jig 4 can be divided in the plane of the tube. The two halves of the bending jig are denoted by 5 and 6 in FIG. 2c. During the bending operation, gas denoted by arrows P is blown into the tube. As a result of said inflation operation, the cross-section of the tube remains circular. The tube is then laid on a supporting member which consists of a plate 7 which comprises a circular aperture 8 the diameter of which is a few mm larger than the diameter of the bending jig 4. The tongs 2 and 3 are then removed and the ends 9 and 10 of the tube are each clamped in holder members 11 and 12, respectively. FIG. 2f which is a sectional view taken on the line IIF-IIF of FIG. 2e shows that each of the holder members 11 and 12 consists of a hook which is pivotally secured to the plate 7. As soon as the ends of the tube are clamped in the holder members 11 and 12, the bending jig 4 is removed. In order to remove the bending jig, the part 5 is moved upwards and the part 6 is moved downwards through the aperture 8. As shown in FIG. 2g the tube remains on the assembly of plate with holder members and will remain secured thereto during the further treatments to which the tube is to be subjected, for example, rinsing and evacuating.

Figure 3A:
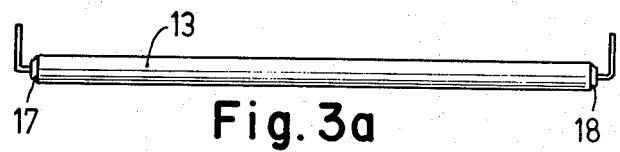
Figure 3B:
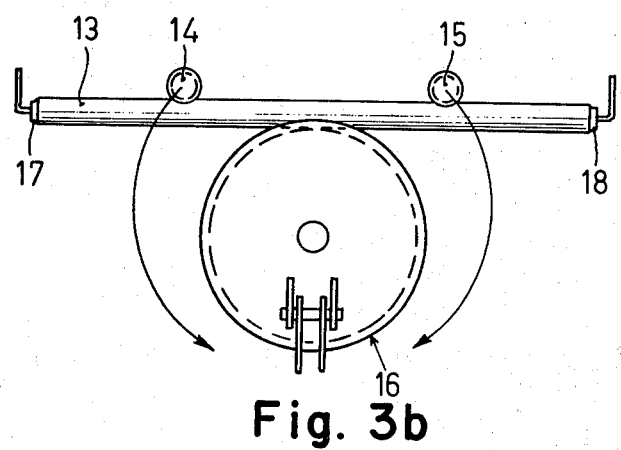
Figures 3D, 3E:
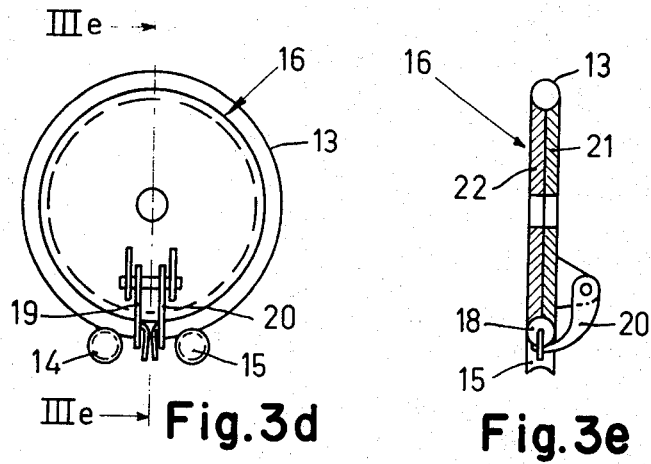
Figure 3C:
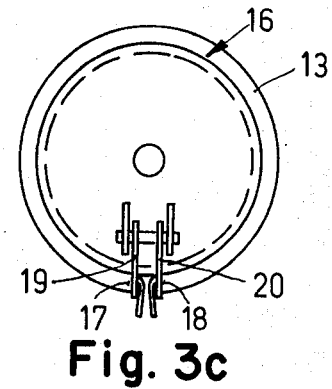

In the embodiment shown in FIGS. 3a–3e a straight glass tube 13 (FIG. 3a) is bent in the horizontal plane to form a circle. The bending operation is carried out by means of two rollers 14 and 15 which force the tube about the bending jig 16 (FIG. 3b). The movements which the rollers make are replicas of each other. The bending jig 16 can be divided in the plane of the tube. During the bending operation, gas is also blown into the tube. As a result of the blowing operation, the cross-section of the tube remains circular.

The difference between the embodiment shown in FIG. 3 and the embodiment shown in FIG. 2 consists mainly in that the supporting member is not formed by a separate plate but by the bending jig itself, while the bending members are not formed by tongs but by rollers. After the tube 13 has been bent around the bending jig 16 by the rollers 14 and 15, the ends 17 and 18 of the tube are clamped on the bending jig 16 by the holder members 19 and 20, respectively. The bending jig 16 can be divided into two parts 21 and 22. The holder members 19 and 20 are secured to the upper part 21. In this embodiment the tube is held on the jig on which it is bent during the cooling and the further treatments. Of course, several bending jigs are required in the series production of lamp envelopes for fluorescent lamps.

In the embodiments shown the tube is bent in the horizontal plane. In addition to the advantages already mentioned, this presents the additional advantage that the movements to be carried out with the tube and the bending tools are simple.

Of course, in the embodiment shown in FIG. 2 rollers may also be used instead of tongs, while in the embodiment shown in FIG. 3 tongs may be used instead of rollers.

What is claimed is:

1. A method for manufacturing a tubular lamp envelope which is particularly suitable for a fluorescent lamp envelope wherein the tube is curved in a plane over at least a part of its length comprising:
    softening an initially straight tube by heating to a temperature sufficient to permit bending;
    urging the heated tube around a bending jig having a circumferential surface having a groove for cooperation with the tube by means of one or more bending members, said bending jig having said circumferential surface disposed in a generally horizontal plane;
    inflating the tube to produce a substantially circular cross-section;
    cooling the tube to a predetermined temperature just sufficient to avoid deformation of the shape of the tube as a result of gravity forces; and
    providing a supporting member having a generally planar surface disposed in a horizontal plane;
    providing holding members separate from said bending members, said holding members being carried on said supporting member;
    holding the tube in a horizontal plane by means of said holding members and interrupting said urging step as soon after start of said holding as said predetermined temperature has been reached;
    at least part of said inflating step and at least a part of said cooling step being performed contemporaneously, said holding step being accomplished with said supporting member.

2. The method as described in claim 1 wherein at least a part of said inflating step and at least a part of said cooling step are performed contemporaneously.

3. A method as claimed in claim 1 wherein the assembly of said supporting member and said holding member is constructed as a transport unit on which the tube is held during treatments which succeed said bending step.

4. A method as claimed in claim 1, wherein the supporting member includes a bending jig.

5. A method as claimed in claim 1, wherein the bending jig comprises two cooperatively contoured and dimensioned elements meeting in the plane of the tube, said supporting member being formed by one half of the bending jig.

6. A method as claimed in claim 1, wherein the bending jig can be divided in the plane of the tube, the cooperation between the bending jig and the tube being interrupted by dividing the bending jig as soon as the tube is supported by the supporting member, said generally planar surface comprising an aperture for passing one of the halves of the bending jig.

7. A method as claimed in claim 1, wherein the movements which the ends of the tube make during the bending operation relative to the bending jig are replicas of each other.

* * * * *